United States Patent
Wang et al.

(10) Patent No.: US 6,519,114 B1
(45) Date of Patent: Feb. 11, 2003

(54) MAGNETIC STORAGE MEDIUM HAVING A TEXTURED ZONE

(75) Inventors: Li-Ping Wang, Fremont, CA (US); David Shiao-Min Kuo, Castro Valley, CA (US); Wei Hsin Yao, Fremont, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/272,786

(22) Filed: Mar. 19, 1999

Related U.S. Application Data (60) Provisional application No. 60/078,626, filed on Mar. 19, 1998.

(51) Int. Cl.[7] .................................................. G11B 5/84
(52) U.S. Cl. ...................................................... 360/135
(58) Field of Search ................................... 360/135, 133; 364/571.074, 571.01; 427/554, 555; 428/141, 694, 900, 64.1, 64.2, 64.3, 64.4, 65.3

(56) References Cited

U.S. PATENT DOCUMENTS

| | | | | |
|---|---|---|---|---|
| 5,062,021 A | * | 10/1991 | Ranjan et al. | 360/135 |
| 5,790,433 A | * | 8/1998 | Barenboim et al. | 364/571 |
| 5,909,341 A | * | 6/1999 | Hikosaka et al. | 360/104 |
| 5,949,612 A | * | 9/1999 | Gudeman et al. | 360/97.01 |
| 5,956,217 A | * | 9/1999 | Xuan et al. | 360/135 |
| 5,973,894 A | * | 10/1999 | Ohsawa et al. | 260/135 |
| 6,007,896 A | * | 12/1999 | Bhushan | 428/141 |
| 6,068,891 A | * | 5/2000 | O'Dell et al. | 427/555 |
| 6,246,543 B1 | * | 6/2001 | Baumgart et al. | 360/135 |

* cited by examiner

Primary Examiner—Hoa T. Nguyen
Assistant Examiner—Chen Tianjie
(74) Attorney, Agent, or Firm—Fish & Richardson P.C.

(57) ABSTRACT

A storage medium is provided that includes a texture zone having a plurality of protrusions. Each of the protrusions is separated by a short circumferential pitch. Alternatively, the texture zone includes a plurality of protrusions with a circumferential pitch less than the diameter of any protrusion. The resonance excitation between the magnetic head and the storage medium in the data storage system is reduced by forming the texture zone with the protrusions that cause the excitation frequencies of the data storage system to shift away from its resonance frequencies.

17 Claims, 6 Drawing Sheets

MAGNETIC STORAGE MEDIUM HAVING A TEXTURED ZONE

This application claims the benefit of Provisional patent application, Serial No. 60/078,626, filed Mar. 19, 1998, entitled "Laser Zone Texture of Pseudo-Spiral Line Design or with Short Circumferential Pitches for Low Glide Height Ability."

BACKGROUND OF THE INVENTION

The present invention relates generally to a magnetic data storage system, and more particularly, to magnetic storage media employed in the data storage system having textured zones.

Conventional data storage systems, such as a disc drive, employ magnetic storage media, such as a disc, to store large amounts of data in magnetic form. Typically, one or more media are rotated on a spindle relative to a magnetic head. The magnetic head is used to read or write data to or from the storage medium.

A typical contact start and stop (CSS) operating regime commences when the head begins to slide against the surface of the medium as the medium rotates. Once a suitable speed is achieved, the head floats at a predetermined distance from the surface of the medium due to an aerodynamic lift force caused by airflow generated between the magnetic head and the storage medium.

The magnetic head typically includes a slider having an air bearing surface. During reading and recording operations, the head is maintained at a controlled distance from the recording surface. The head is supported on the air bearing surface as the medium rotates such that the head can be freely moved in both the circumferential and radial directions allowing data to be recorded onto or read from the medium. When the data storage system stops, the rotational speed of the medium decreases, and the head again begins to slide against the surface of the medium, and eventually stops in contact with a surface of the medium. Thus, the head contacts the recording surface whenever the medium is stationary, accelerated from the stop, during deceleration, and prior to completely stopping. This process continues each time the data storage system is operated.

The distance between the head and the storage medium during operation is minimized to increase the storage density of the storage system. Generally, a smooth recording surface is preferred, to permit the head and the medium to be positioned in close proximity. This results in a more consistent behavior between the air bearing surface of the magnetic head and the storage medium. However, if the head surface and recording surface are too flat, stiction and friction during the start-up and stopping phases may occur. This may cause wear to the head and recording surfaces and eventually lead to "head crash".

One technique to avoid stiction is to roughen the recording surface of the magnetic storage medium to reduce the friction between the head and the medium. This is known as "texturing." Typical texturing techniques involve polishing the surface of a medium substrate to provide a texture thereon-prior to subsequent deposition of layers, such as an underlayer, a magnetic layer, a protective overcoat, and a lubricant topcoat. The textured surface on the substrate is substantially formed in the subsequently deposited layers.

To achieve higher recording densities, greater requirements are imposed on the magnetic storage medium in terms of coercivity, stiction, and narrow track size. In addition, increasingly high density and large capacity magnetic media require increasingly smaller fly heights. The term fly height generally refers to the distance between the storage medium and the head as the head flies over the recording surface of the medium. Reduced fly heights also pose difficulty when using texturing techniques because of the increased probability of contact between the head and the medium.

Several problems exist with known texturing techniques. For example, it is extremely difficult to provide a clean textured surface due to debris formed by mechanical abrasions during mechanical texturing. The surface becomes scratched during mechanical operations, which contributes to poor glide characteristics and higher defects. In addition, various desirable manufacturing substrates are difficult to process by mechanical texturing.

Alternatively, laser texturing has been employed, and includes a laser light being focused on an upper surface of a non-magnetic substrate. Conventional laser texturing techniques have previously been applied to metal-containing substrates. Such substrates, however, exhibit a tendency toward corrosion, and are relatively fragile, thereby limiting their utility. On the other hand, glass and glass-ceramic substrates may be employed. However, it is extremely difficult to provide an adequate texture on a glass or glass-ceramic substrate.

Current laser texture designs include a matrix of isolated bumps with specified circumferential and radial pitches. The bump height is tightly controlled to give a uniform support to the head during the rest position. However, the regular pattern of bump arrangements is known to cause a resonance excitation. Resonance excitation is the situation where fluctuations occur in the fly height during take off and landing of the head relative to the medium. The periodic pattern of the bump matrix excites the head when it flies close to the texture. When an excitation frequency matches one of the resonance frequencies of the data storage system, enhanced head vibration results and head crash is more common.

One technique for reducing resonance excitation includes reducing the texture excitation strength at the operating resonance frequencies. The bump locations in the texture zone may be partially randomized. This results in a texture pattern that has a wide spectrum of excitation frequencies. However, the above configuration does not permit significantly lower fly heights to be achieved. This is because the resonance excitation is not adequately minimized.

Therefore, a-need exists for a storage media having textured surfaces for contact with magnetic storage heads that minimizes resonance excitation between the magnetic head and the storage medium.

SUMMARY OF THE INVENTION

In one aspect, the invention is directed to a method for manufacturing a magnetic recording medium that includes texturing a surface of the medium to form a texture zone. The texture zone includes a plurality of protrusions, where each of the protrusions is separated by a circumferential pitch. The circumferential pitch is chosen to move the excitation frequencies of the texture zone away from the resonance frequencies of a magnetic head.

Implementations of the invention include one or more of the following. The diameter of each of the protrusions may be between 1 $\mu$m and 20 $\mu$m. The circumferential pitch may vary with the diameter of the plurality of protrusions. The texturing step includes forming the texture zone by laser texturing. The plurality of protrusions may be formed to create a plurality of periodic texture features. The periodicity of the textured features may correspond to the circumferential pitch.

In another aspect, the invention is directed to a data storage system that includes a magnetic storage medium having a texture zone. A magnetic head is positioned relative to the storage medium. The texture zone is formed from a plurality of protrusions in which each of the protrusions is separated by circumferential pitch. The circumferential pitch is chosen to move the excitation frequencies of the texture zone away from the resonance frequencies of the magnetic head.

Implementations of the invention include one or more of the following. The data storage system may include a slider having a first surface and a second surface. An air bearing surface may be formed on the second surface, and a transducer assembly may be formed proximate the air bearing surface to read or write data to or from a plurality of data tracks on the medium. The medium may include a plurality of layers formed on a surface of the medium.

BRIEF DESCRIPTION OF THE DRAWING

The accompanying drawings, which are incorporated in and constitute a part of the specification, illustrate presently preferred embodiments of the invention and, together with the general description of the preferred embodiments given below serve to explain the principles of the invention.

DESCRIPTION OF THE PREFERRED EMBODIMENTS

Laser texturing a metal-containing surface, such as plated aluminum or aluminum alloy substrate, includes forming protrusions which extend substantially from the substrate. The protrusions improve the tribological performance of the resulting magnetic recording medium. However, the regular pattern of known protrusion arrangements is known to cause resonance excitation of the head. This may occur during head take-off and landing. The periodic pattern of the protrusion matrix excites the head when it flies close to the texture. This is because known periodic protrusions modulate the fly height when the head flies close to the medium. The excitation frequencies at which resonance occur are determined by the rotation speed of the medium and by the circumferential pitch between protrusions. Additionally, the protrusion height is dependent upon several factors including laser spot size, laser pulse width, and laser pulse energy.

Accordingly, it has been found that shifting the texture excitation frequencies away from the resonance frequencies of the head may reduce resonance excitation.

In one embodiment, a texture zone formed from a plurality of discrete protrusions may be employed. The circumferential pitch between the protrusions is minimized such that the texture excitation frequency is suitably higher than the resonance frequency of the head. The circumferential pitch may be less than the diameter of each protrusion. Alternatively, protrusions with smaller protrusion heights may be combined to form periodic texture features that correspond to the circumferential pitch.

Figure 1:
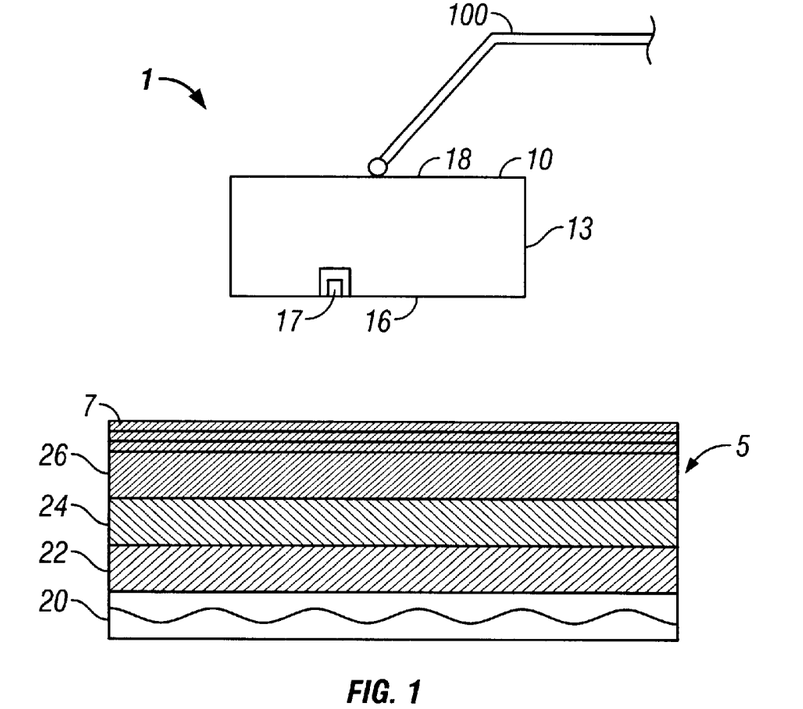
FIG. 1 is a schematic diagram of a portion of a data storage device including a magnetic head and a magnetic storage medium in accordance with an embodiment.

FIG. 1 is a schematic diagram of a portion of a data storage system 1 that includes a magnetic recording medium 5, such as a magnetic disk, and a magnetic head 10. The data storage system 1 may be, for example, a disk drive. Magnetic head 10 may be an inductive head or a magnetoresistive head. The magnetic head 10 applies magnetic fields to the medium to record data. Also, magnetic head 10 detects magnetic fields from the medium 5 to reproduce data.

Medium 5 may be a multi-layered structure. Medium 5 may include a substrate 20. Substrate 20 may be formed from Al/NiP. Substrate 20 may include an underlayer film 22, a magnetic film 24, and a protection film 26 that are formed onto substrate 20 in a conventional manner. Layers 22, 24, and 26 are optional and may be formed in any combination on substrate 20, as described below. Medium 5 also includes a plurality of data tracks 7 that are formed on the medium surface in a conventional manner.

During operation, the medium 5 is rotated at a suitable speed for recording or reproducing bits of information onto one of the data layers 7 of medium 5. As the medium spins, the magnetic head 10 is moved relative to the medium 5 by, for example, a load arm 100 (FIG. 1).

The magnetic head 10 includes a slider 13 that supports a transducer assembly 17. The transducer assembly 17 is configured to read and write information to and from data tracks 7.

Slider 13 includes an air bearing surface 16 and a top surface 18. The air bearing surface may be a "negative pressure slider" or a "positive pressure slider". In a negative pressure configuration, a recessed portion (not shown) is formed on air bearing surface 16. As air flows between the medium 5 and the head 10, a negative lift force is formed toward the surface of the medium and partially counters an aerodynamic lift force that is generated as the medium 5 spins. This results because air passing on the air bearing surface 16 expands. Preferably, the slider 13 is formed from a ceramic material. The slider 13 may be formed from materials such as alumina or titanium carbide.

The magnetic head 10 and the medium 5 are separated by an air gap 28, i.e., the distance between the head 10 and the medium 5. This may also be referred to as the flying height.

Figure 2:
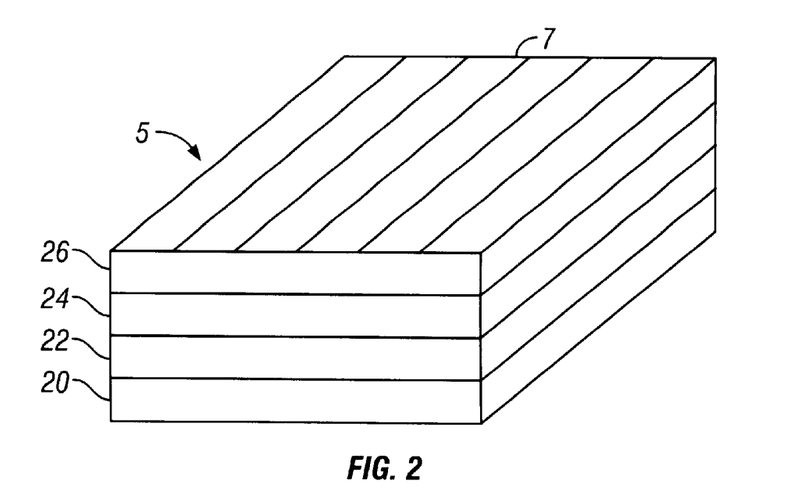
FIG. 2 is a schematic diagram of a multilayered structure of the storage medium of FIG. 1.

FIG. 2 illustrates that the substrate 20 is initially polished to provide a specular surface and a texture zone by, for example, laser texturing. Magnetic layer 24 is then deposited on the substrate 20 and may be any conventional layer employed in magnetic recording. Such conventional magnetic layers include cobalt-based alloys. The underlayer 22 may be deposited on the textured substrate 20 prior to depositing the magnetic layer 24. The underlayer 22 can comprise chromium or chromium-alloy. Also, a protective overcoat 26, such as a carbon overcoat, may be deposited on the magnetic layer 24, and a lubricant topcoat (not shown) may be deposited on the protective overcoat 26. The underlayer 22, magnetic layer 24, and protective overcoat 26 may be applied in a conventional manner, for example, by sputtering techniques.

Figure 3A:
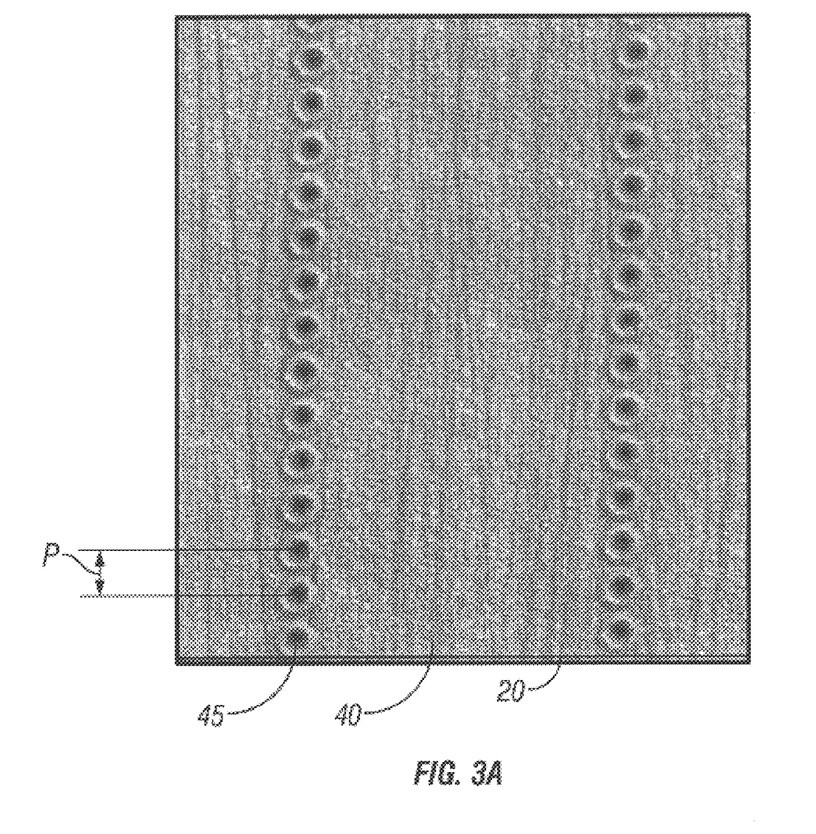
FIGS. 3A–3B schematically illustrate a magnetic storage medium in accordance with a first embodiment.
Figure 3B:
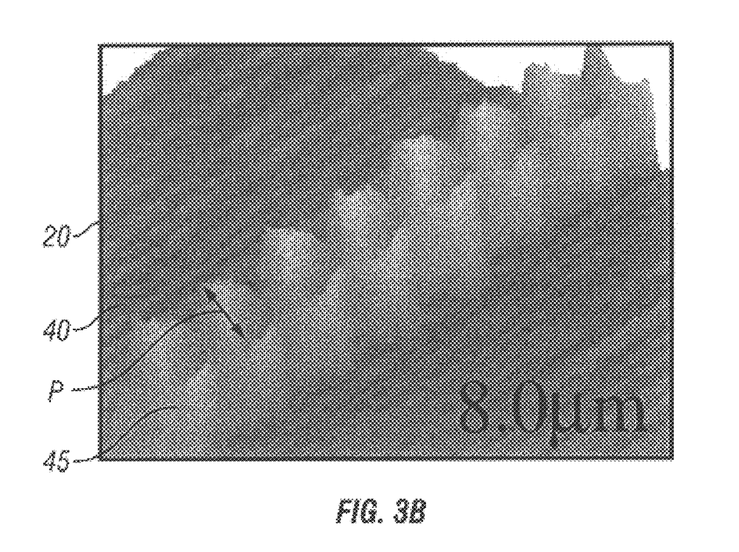

FIGS. 3A–3B schematically show a substrate 20 with a texture zone 40 in accordance with one embodiment. The texture zone 40 may include a plurality of protrusions 45. Each of the protrusions 45 may be separated by a circumferential pitch "P".

In a preferred method, the protrusions 45 are formed by heating a localized area of substrate 20 by, for example, a laser (not shown). As the heated area cools (solidifies), it has been found that the area near the center of the spot forms protrusions 45. This is because of the surface tension of the medium 5. By varying the pulse rate of the laser, it has been found that the circumferential pitch may be reduced to increase the texture excitation frequencies. Accordingly, the vibration of head 10 may be minimized. The circumferential pitch may vary up to about three times the diameter of protrusions 45. Suitable diameters for protrusions 45 are between 1 µm and 20 µm.

Figure 4A:
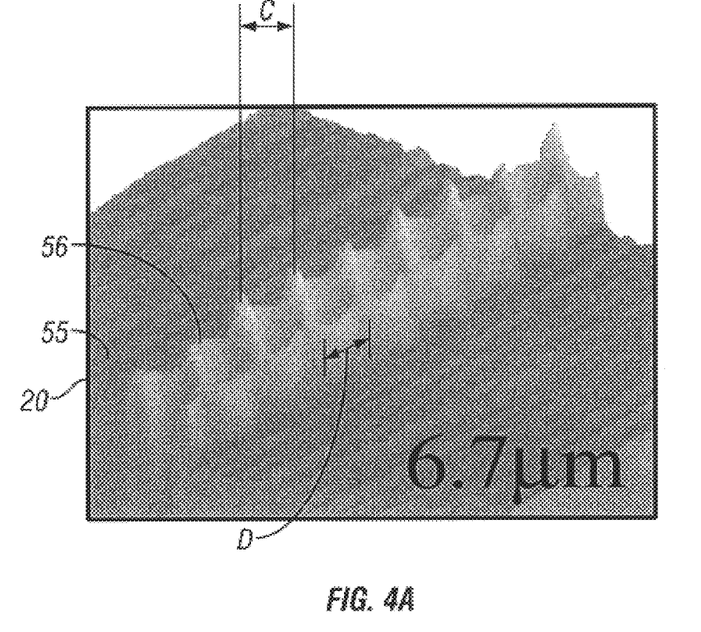
FIGS. 4A–4D schematically illustrate a magnetic storage medium in accordance with a second embodiment.
Figure 4B:
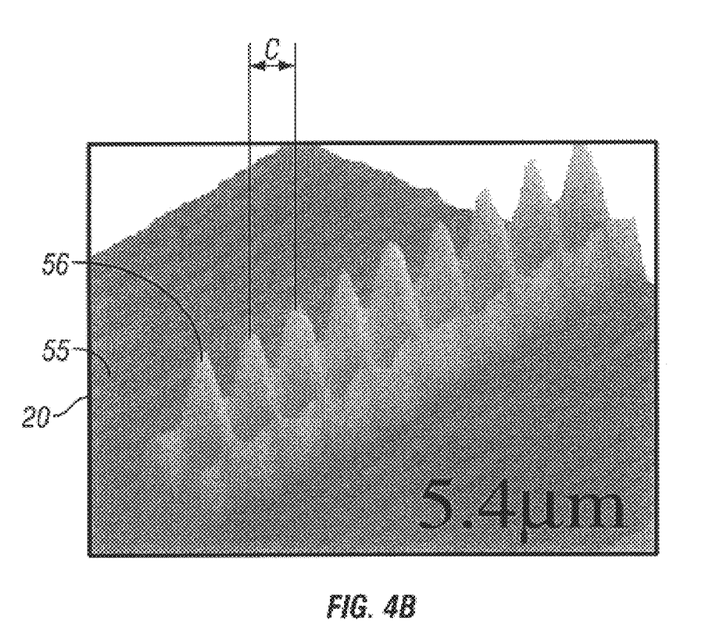
Figure 4C:
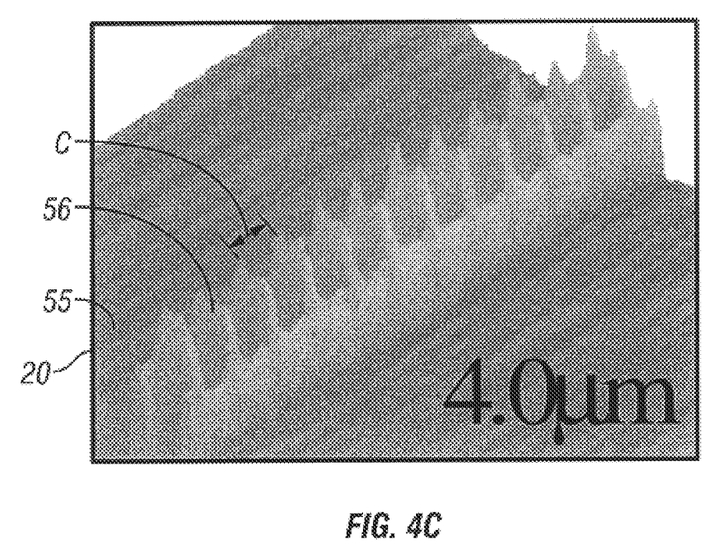
Figure 4D:
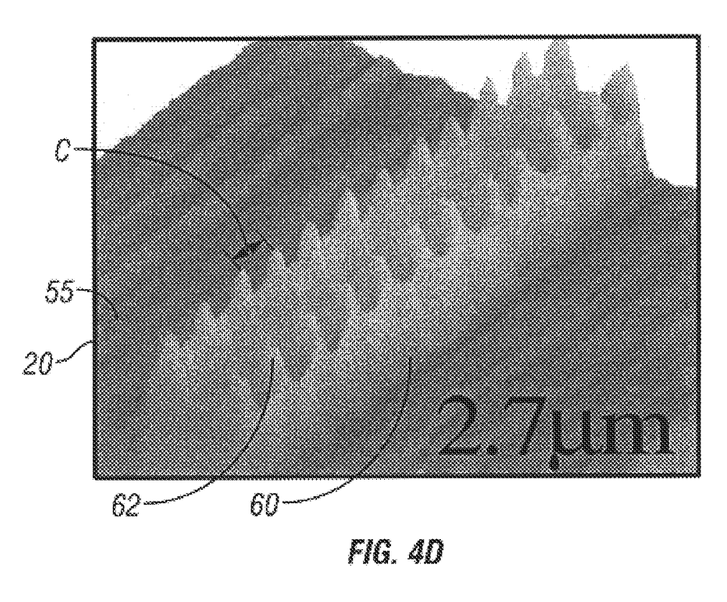

FIGS. 4A–4D illustrate an alternative embodiment in accordance with the present invention. In this configuration, the texture zone 55 is formed from protrusions 56. Protrusions 56 may be formed by laser texturing, as described above. Each of the protrusions 56 is separated by a circumferential pitch "C" that is less than the protrusion diameter "D" (FIG. 4A). As the circumferential pitch C decreases, the resulting protrusions tend to overlap. For example, it has been found that a spiral baseline structure 60 with periodic texture features 62 may be formed (FIG. 4D). The distance between periodic texture features 62 corresponds to the selected pitches.

For example, as shown in FIG. 4B, the distance between adjacent texture features 62 is approximately equal to about the pitch C, 5.4 µm.

It has also been found that small protrusion heights may be combined to generate higher excitation frequencies using the above overlap configuration. The size of the periodic features 62 decreases as the circumferential pitch C decreases. For example, as shown in FIG. 4B, for a circumferential pitch of 5.4 µm, the protrusion height 65 is larger than the protrusion height 64 shown in FIG. 4D, corresponding to a circumferential pitch of 2.7 µm.

This means that miniaturized data heads that are employed to increase the density storage of the storage system 1 can be used. This is because smaller heads tend to have higher resonance frequencies. Thus, by combining the textured excitation frequencies of smaller protrusions, smaller heads can be used. Accordingly, lower fly heights can be achieved in which minimal contact between the head and medium occurs.

Figure 5:
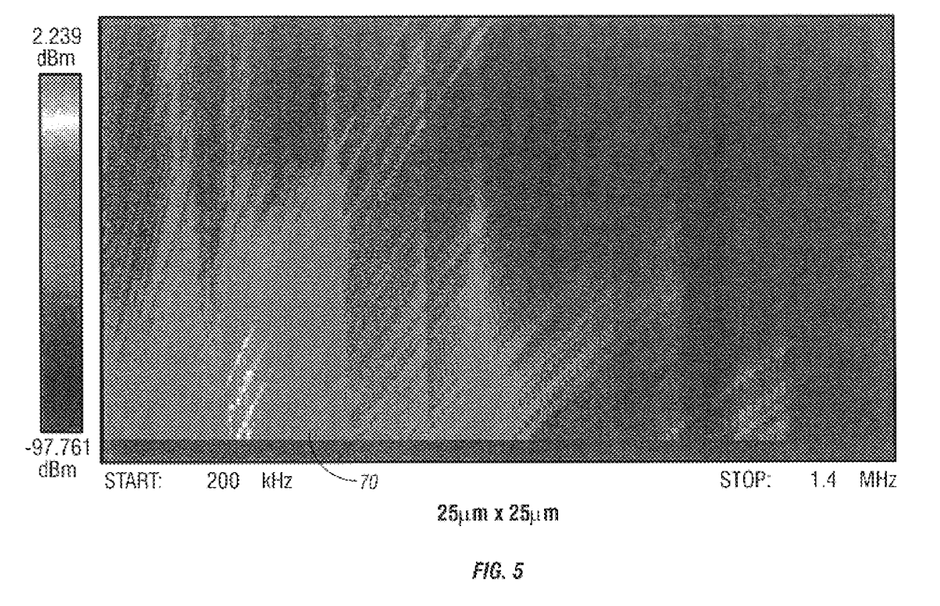
FIG. 5 illustrates a relationship for resonance excitation between the magnetic head and a magnetic storage medium having a conventional texture zone.
Figure 6:
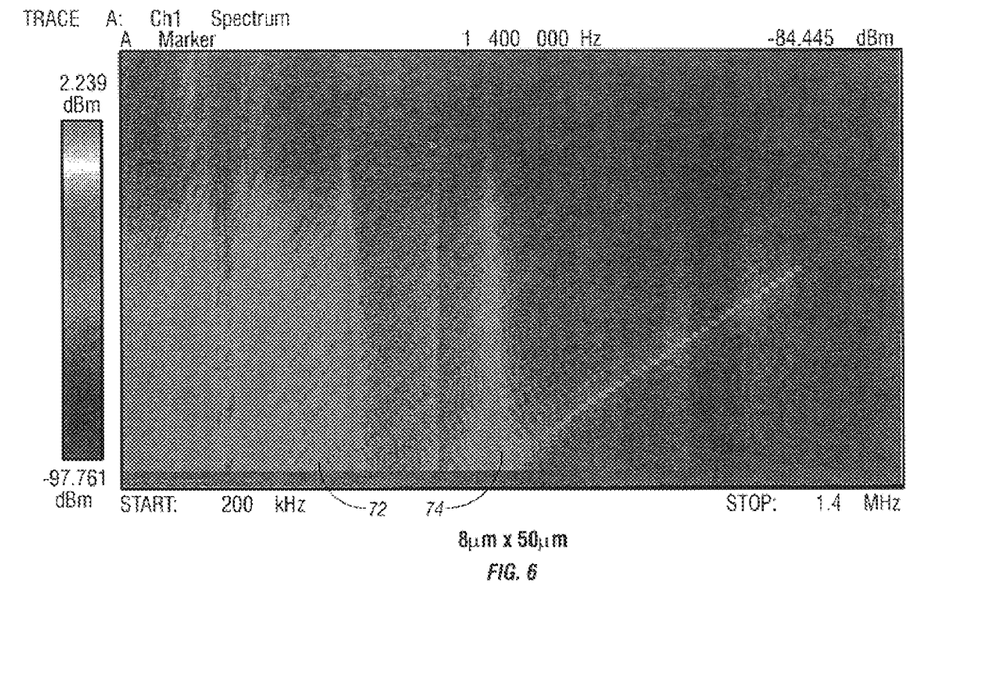
FIG. 6 illustrates a relationship for resonance excitation between the magnetic head and a magnetic storage medium having a texture zone in accordance with the present invention.

FIGS. 5 and 6 illustrate spectrograms of a head traveling over a magnetic storage medium. A sensor (not shown) was employed to measure vibration of the head at different frequencies in a conventional manner.

FIG. 5 illustrates experimental results for a medium with a conventional texture zone. In this configuration, the texture zone had a circumferential pitch of 25 µm. Significant vibration was seen for excitation frequencies that approached the texture frequencies, as indicated by arrow 70.

FIG. 6 illustrates experimental results in accordance with the preferred method for a reduction in circumferential pitch (e.g., 8 µm). The vibration was significantly reduced for excitation frequencies near the resonant frequencies, as indicated by arrow 72. Additionally, for high excitation frequencies, as indicated by arrow 74, the vibration of the head was minimal.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the amended claims and their equivalents.

What is claimed is:

1. A method for reducing excitation of an air bearing surface, of a slider with a magnetic comprising:
    texturing a surface of a magnetic storage medium to form a texture zone, the texture zone including a plurality of protrusions, each of the protrusions being separated by a circumferential pitch and the circumferential pitch being chosen to move excitation frequencies of the texture zone away from resonance frequencies of the magnetic head in response to the air bearing surface flying over the medium and the circumferential pitch varying with a diameter of each of the protrusions and the diameter of each protrusion being one of differing and substantially the same.

2. The method of claim 1, wherein the diameter of each of the protrusions is between 1 µm and 20 µm.

3. The method of claim 1, wherein the texturing the surface comprises forming the texture zone by laser texturing.

4. The method of claim 1, wherein the texturing the surface further comprises forming the plurality of protrusions to create a plurality of periodic texture features, the periodicity of the texture features corresponding to the circumferential pitch.

5. The method of claim 1 further comprising varying a pulse rate of a laser to reduce the circumferential pitch and to increase the texture excitation frequencies.

6. The method of claim 1, wherein the plurality of projections comprise a spiral baseline structure.

7. The method of claim 1, wherein the varying the circumferential pitch comprises varying the circumferential pitch to be one of greater than or less than the diameter of each of the protrusions.

8. A data storage system, comprising:
    a storage medium having a texture zone; and,
    a magnetic head positioned relative to the medium, the texture zone being formed from a plurality of protrusions, each of the protrusions being separated by a circumferential pitch and the circumferential pitch being chosen to move excitation frequencies of the texture zone away from resonance frequencies in response to an air bearing surface of the magnetic head flying over the medium and the circumferential pitch varying with a diameter of each of the protrusions and the diameter of each protrusion being one of differing and substantially the same.

9. The system of claim 8, wherein the diameter of each of the protrusions is between 1 µm and 20 µm.

10. The system of claim 8, wherein the texture zone is formed by laser texturing.

11. The system of claim 8, wherein the plurality of protrusions are formed to create a plurality of periodic texture features, the periodicity of the texture features corresponding to the circumferential pitch.

12. The system of claim 8, wherein the magnetic head comprises:
    a transducer assembly formed proximate the air bearing surface to read or write data to or from a plurality of data tracks on the medium.

13. The system of claim 8, wherein the medium further comprises a plurality of layers formed onto a surface on the medium.

14. The system of claim 8, wherein the medium comprises metal.

15. The system of claim 8, wherein the circumferential pitch is less than the diameter of each of the protrusions.

16. The system of claim 8, wherein the circumferential pitch is greater than the diameter of each of the protrusions.

17. A data storage system comprising:

a storage medium having a texture zone; and, a texturing means formed on the texture zone to minimize resonance excitation at the storage medium in response to an air bearing surface flying over the medium, the texturing means including a plurality of protrusions having a circumferential pitch, and the circumferential pitch varying with a diameter of each of the protrusions and the diameter of each protrusion being one of differing and substantially the same.

* * * * *